US011362319B2

(12) United States Patent
Jochler et al.

(10) Patent No.: US 11,362,319 B2
(45) Date of Patent: Jun. 14, 2022

(54) METHOD AND SYSTEM FOR DEPOSITING SOLID ELECTROLYTE ON ELECTRODE ACTIVE MATERIAL WHILE RETAINING CRYSTAL STRUCTURE OF SOLID ELECTROLYTE

(71) Applicant: VOLKSWAGEN AKTIENGESELLSCHAFT, Wolfsburg (DE)

(72) Inventors: Enrica Jochler, Allerbuettel (DE); Dominik Alexander Weber, Berlin (DE); Patrick Schichtel, Adenbuettel (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 198 days.

(21) Appl. No.: 16/554,439

(22) Filed: Aug. 28, 2019

(65) Prior Publication Data
US 2020/0075931 A1 Mar. 5, 2020

(30) Foreign Application Priority Data
Aug. 31, 2018 (DE) ...................... 10 2018 121 275.5

(51) Int. Cl.
*H01M 4/131* (2010.01)
*H01M 10/0562* (2010.01)
(Continued)

(52) U.S. Cl.
CPC ............ *H01M 4/131* (2013.01); *C25D 17/00* (2013.01); *H01M 4/366* (2013.01); *H01M 4/38* (2013.01);
(Continued)

(58) Field of Classification Search
CPC ........ H01M 4/131; H01M 4/366; H01M 4/38; H01M 10/0525; H01M 10/0562; H01M 10/0566; C25D 17/00
(Continued)

(56) References Cited

U.S. PATENT DOCUMENTS

2011/0045348 A1 2/2011 Kubo et al.
2012/0073971 A1* 3/2012 Prieto .................... C25D 13/02
204/490

(Continued)

FOREIGN PATENT DOCUMENTS

DE 10 2014 226 929 A1 11/2015
DE 10 2015 217 749 A1 3/2017
(Continued)

OTHER PUBLICATIONS

Austin, D.G., Chemical Engineering Drawing Symbols, 1979, Halsted Press (Year: 1979).*
(Continued)

*Primary Examiner* — Sean P Cullen
(74) *Attorney, Agent, or Firm* — Pearl Cohen Zedek Latzer Baratz LLP

(57) ABSTRACT

A method for deposition of solid electrolyte material on electrode active material, comprising the steps of a feed of electrode active material from a first storage unit to a first dosing means with a simultaneous feed of solid electrolyte material from a second storage unit to a second dosing means, a feed of inert gas to the first dosing means and to the second dosing means via an inert gas feed means, a feed of the electrode active material via the first dosing means into a reaction space with simultaneous feed of the solid electrolyte material via the second dosing means into the reaction space, wherein the electronic structure of the electrode active material and of the solid electrolyte material is
(Continued)

influenced during the feed to the reaction space via the first and second dosing means, such that the electrode active material and the solid electrolyte material bond to one another at least in part while retaining the crystal structure of the solid electrolyte material.

10 Claims, 2 Drawing Sheets

(51) Int. Cl.
*H01M 4/36* (2006.01)
*H01M 10/0525* (2010.01)
*H01M 10/0566* (2010.01)
*C25D 17/00* (2006.01)
*H01M 4/38* (2006.01)
*H01M 50/46* (2021.01)

(52) U.S. Cl.
CPC ... *H01M 10/0525* (2013.01); *H01M 10/0562* (2013.01); *H01M 10/0566* (2013.01); *H01M 50/46* (2021.01); *H01M 2300/0065* (2013.01)

(58) Field of Classification Search
USPC ............................................. 429/218.1, 232
See application file for complete search history.

(56) References Cited

U.S. PATENT DOCUMENTS

| | | |
|---|---|---|
| 2014/0234715 A1 | 8/2014 | Fasching et al. |
| 2015/0340741 A1 | 11/2015 | Kim et al. |
| 2017/0018760 A1 | 1/2017 | Lupart et al. |
| 2017/0338522 A1* | 11/2017 | Hu ........................ H01M 50/46 |
| 2018/0138494 A1* | 5/2018 | Birt ..................... H01M 4/1397 |
| 2018/0261880 A1 | 9/2018 | Marusczyk et al. |
| 2019/0006697 A1* | 1/2019 | Danko .................. C23C 14/223 |

FOREIGN PATENT DOCUMENTS

| | | | |
|---|---|---|---|
| JP | 2009280874 A | 12/2009 | |
| JP | 2011124028 A | 6/2011 | |
| JP | 2016213106 A | * 12/2016 | |
| WO | WO 2016/196688 A1 | 12/2016 | |
| WO | WO-2017108625 A1 | * 6/2017 | ........... C23C 14/223 |

OTHER PUBLICATIONS

Office Action for German Patent Application No. 10 2018 121 275, dated Feb. 9, 2022.

* cited by examiner

METHOD AND SYSTEM FOR DEPOSITING SOLID ELECTROLYTE ON ELECTRODE ACTIVE MATERIAL WHILE RETAINING CRYSTAL STRUCTURE OF SOLID ELECTROLYTE

CROSS-REFERENCE TO RELATED APPLICATIONS

This application claims priority from German Patent Application No. 10 2018 121 275.5, filed Aug. 31, 2018, which is hereby incorporated by reference.

FIELD OF THE INVENTION

The present invention relates to a method and a system for depositing a solid electrolyte material on an electrode active material.

BACKGROUND OF THE INVENTION

The document DE 10 2015 217 749 A1 relates to a coated cathode active material for a battery cell, wherein the coating is formed as a lithium ion conducting solid electrolyte, and a physical, mechanical or wet chemical process is used as the coating method.

The document US 2017/0018760 A1 relates to a coated active cathode material for secondary lithium cells and batteries, wherein the coating is formed as a solid lithium ion conductor with a layer thickness of 20-50 nm, and a physical process, for example, ALD, PECVD or PLD, is used as the coating method.

The document WO 2016/196688 A1 relates to a method for coating anode and cathode material, wherein the coating is produced in the form of metal oxides, metal halides, metal oxyhalides, metal phosphates or the like, and ALD, MLD, CVD, PVD or the like is used as the coating method.

The document US 2011/0045348 A1 relates to a coated cathode active material having a resistance reducing coating material as well as a lithium battery for use of the cathode active material.

The document US 2014/0234715 A1 relates to a protective coating for cathode active materials, wherein the coating is produced in the form of aluminum oxide, aluminum phosphate or aluminum fluoride by dipping, spray coating or ALD.

One disadvantage of the aforementioned methods is that many of the solid electrolytes used are not stable with respect to high voltages and therefore are unsuitable as a protective coating. Furthermore, it is impossible to synthesize these materials by means of certain methods. In addition, many of the aforementioned methods are very complex and expensive and therefore are difficult to use on an industrial scale. Furthermore, some of these methods usually require additional purification steps, which may be very complex, depending on the requirements of the process.

SUMMARY OF THE INVENTION

The object of the present invention is therefore to eliminate at least partially the disadvantages described above. In particular, the object of the present invention is to make available a method and a system for deposition of solid electrolyte material on electrode active material, which can be used in a variety of ways and can be carried out easily and inexpensively.

The object defined above is achieved by a method having the features of claim 1 as well as a system according to claim 10. Additional features and details of the invention are derived from the dependent claims, the description and the drawings.

Technical features disclosed for the method according to the invention are also applicable in conjunction with the system according to the invention and vice-versa, so that reference is and/or can always be made mutually to the individual aspects of the invention with regard to the disclosure. Expedient embodiments of the invention are defined in the dependent claims.

In the method according to the invention for deposition of solid electrolyte material on electrode active material, the electrode active material is first fed from a first storage unit to a first dosing means with a simultaneous feed of solid electrolyte material from a second storage unit to a second dosing means. The electrode active material here may be formed either as anode active material or as cathode active material. The storage units here may preferably be formed as reactors, reaction vessels, reaction containers or the like.

Within the scope of the method according to the invention, inert gas is fed to the first and second dosing means via an inert gas feed means after feeding the electrode active material and the solid electrolyte material. The inert gas used here may preferably be a noble gas, in particular argon, but it may also be some other gas, such as nitrogen, for example, or the like.

After feeding the inert gas to the first and second dosing means according to the invention, the electrode active material is fed into the reaction space via the first dosing means with simultaneous feed of solid electrolyte material into the reaction space via the second dosing means according to the method in question. In doing so, the materials are advantageously sprayed while being fed into the reaction space in order to offer the largest possible reaction area.

The electrode active material and the solid electrolyte material are fed to the reaction space according to the method in question in such a way that the electronic structure of the electrode active material and that of the solid electrolyte material are influenced while they are being fed to the reaction space in such a way that the electrode active material and the solid electrolyte material bond to one another at least in part while retaining the crystal structure of the solid electrolyte material. Bonds can be formed here by means of dipole interactions, ionic interactions, covalent interactions or other types of interactions, for example. In the present case, the solid electrolyte material is preferably arranged on the electrode active material, in particular being deposited on the electrode active material.

Within the scope of the present invention, an influence on the electronic structure is to be understood as an alignment and/or spatial redistribution of charge carriers of the electrode active material and the solid electrolyte material or even receiving or releasing charge carriers.

Retaining the crystal structure of the solid electrolyte material is to be understood within the scope of the present invention to mean that the basic atomic configuration and/or the basic atomic structure of the crystal structure of the solid electrolyte material is not altered during the process according to the invention. This means that the atomic bonding partners remain the same, despite the fact that there may be changes in bond lengths inside crystallites of the solid electrolyte material.

The electrode material is protected by the solid electrolyte coating, in that it is no longer in direct contact with the liquid catholyte (in the case of a lithium ion battery) or with the solid catholyte (in the case of a solid battery) due to the solid electrolyte coating and therefore a longer lifetime of the cells is ensured.

By means of the method in question, it is possible in particular here to obtain the structure of the solid electrolyte during the coating process. In this way, the electrode active material is protected during coating because, on the one hand, no high temperatures are in effect, and, on the other hand, the electrode active material is also not attacked chemically. In addition to protection of the electrode active material, the method in question can be carried out with a variety of materials that can be produced in powder form, and it does not require any aftertreatment steps.

To ensure the most flexible possible and finely dosable feed of the solid electrolyte materials and electrode active materials within the scope of implementation of the method according to the invention, it is possible in the present case in particular to provide that the solid electrolyte material and the electrode active material are each suspended in solvents separately from one another before being fed to the dosing means. Separate storage and suspension of the materials here allows a flexible choice of a suitable solvent in particular. Thus, highly volatile aprotic solvents, for example, THF, cyclohexane, methyl acetate, chloroform, NMP (N-methylpyrrolidone), NEP (N-ethylpyrrolidone), xylene, pentane, dichloromethane, diethyl ether, acetonitrile or the like may be used for suspension of the solid electrolyte material and the electrode active material in particular.

In order to also permit the most flexible possible and best customized feed of the solid electrolyte material and the electrode active material, it may also be provided according to the invention that the feed of electrode active material to the first dosing means and the feed of solid electrolyte material to the second dosing means take place by means of two different feed means. The feed means here may be embodied in particular in the form of pumps or the like, for example, in the form of hose pumps, rotary vane pumps, scroll pumps or diffusion pumps, turbomolecular pumps, water jet pumps or the like. Thus, by using different feed means, it is not only possible to produce a variable vacuum for the feed of the respective materials to the dosing means but it is also possible to adapt the feed means with regard to the solvent used, which is advantageous in particular because not all pumps are equally suitable for all solvents.

Furthermore, to permit the most varied possible and variably controllable and dosable feed of the solid electrolyte materials to the reaction space, it is possible according to the invention to also provide that the inert gas is heated while being fed. The inert gas here may preferably comprise at least partially noble gases, for example, argon, helium or the like. Furthermore, nitrogen or some other gas and/or certain gas mixtures may also be used. Due to the aforementioned heating of the inert gases, customized feed conditions can be created in particular. It is also conceivable here for the inert gas of the first and second dosing units to each be fed separately via first and second inert gas feed means, which creates a further improvement with regard to the flexibility of the feed conditions to the reaction space.

With regard to a high probability of bonding of the solid electrolyte materials to the electrode active material, it is also possible to provide that, in the method according to the invention, the solid electrolyte material is fed in a size of 2-5 nm. The solid electrolyte materials here may preferably be pulverized or otherwise processed before being suspended. The solid electrolyte material here can be pulverized by mechanical physical production processes in particular, such as milling processes or the like. Likewise, the solid electrolyte material can be produced by chemical physical production processes in a liquid or gaseous phase, for example, precipitation processes or spray pyrolysis or the like. With regard to the size of the solid electrolyte materials, they can preferably be produced and/or pulverized to a size of less than 10 nm, preferably to a size of less than 5 nm, in particular to a size of less than 3 nm.

To provide the broadest possible electrochemical stability window for the coating materials used, according to the invention it is also possible to provide that LLZO (garnet) and/or NASICON may be used as the solid electrolyte materials. Likewise, in addition to the two solid electrolyte materials mentioned above, other materials, which have a similar electrochemical stability window in particular, may also be used, for example, those achieving an electrochemical stability of up to approx. 0.01 V with respect to $Li/Li^+$ (as the solid electrolyte material for an anode material) and/or up to approx. 4.9 V (as the solid electrolyte material for a cathode material).

To ensure the highest possible probability of bonding and/or deposition of solid electrolyte materials on the electrode active material, it is also possible in the method according to the invention to provide that the electrode active material and the solid electrolyte material are oppositely polarized during the feed to the reaction space. In this process, a high voltage can be applied to the dosing means during the feed to the reaction space, so that the electrode active material and the solid electrolyte material are polarized accordingly during the feed process.

To ensure a higher bonding strength and/or a stronger bonding affinity, in particular between the solid electrolyte material and the electrode active material, it is also possible to provide that the electrode active material and the solid electrolyte material are ionized oppositely from one another while they are being fed to the reaction space. This can take place, for example, by applying a high positive or negative voltage to the dosing means. Different ionization methods such as electron bombardment ionization, chemical ionization, field ionization, electron spray ionization and the like may be used in particular for oppositely ionizing the solid electrolyte material and the electrode active material.

With regard to a simple method, which is also inexpensive, for deposition of the bonded particles of electrode active material and solid electrolyte material from the reaction space, it may also be provided in the method according to the invention that the bonded particles of the electrode active material and the solid electrolyte material are deposited from the reaction space by means of a centrifugal separator. Within the context of such a deposition, for example, a reasonable and simple method of separating the exhaust air that contains solvent by means of a discharge device, such as a pump or the like, may be employed while the particles of the electroactive material and solid electrolyte material bonded to one another are deposited in a collecting tank.

The subject matter of the invention is also a system for deposition of a solid electrolyte on electrode active material. The present system comprises a first and a second storage unit for storing electrode active material and solid electrolyte material, at least one feed means for simultaneously feeding electrode active material and solid electrolyte material to a first dosing means and a second dosing means as well as at least one inert gas feed means for feeding inert gas to the first dosing means and the second dosing means. Furthermore, the present system comprises a first dosing means for feeding an electrode active material to a reaction space and a second dosing means for simultaneously feeding a solid electrolyte material to the reaction space, wherein the first dosing means and the second dosing means are designed so that the electronic structure of the electrode active material and of the solid electrolyte material can be influenced while they are being fed to the reaction space in such a way that the electrode active material and the solid electrolyte material bond to one another at least partially while retaining the crystal structure of the solid electrolyte material. The system according to the invention thus offers the same advantages as those already described in detail with respect to the method according to the invention.

To ensure effective communication and control of the individual system components, the individual system components may preferably be connected to one another by means of communication and control lines. Within the scope of a particularly flexible and easily integrated embodiment of the system according to the invention, the individual system components can also communicate in a wireless or noncontact form via Bluetooth, WLAN, NFC, Zigbee or the like.

The subject of the invention is also an electrode produced by the method described above, in particular a lithium ion battery cell comprising an electrode produced by the method described above.

BRIEF DESCRIPTION OF THE DRAWINGS

Additional advantages, features and details of the invention are derived from the following description, in which embodiments of the invention are described in detail with reference to the drawings. The features mentioned in the claims and in the description may be essential to the invention either individually or in any combination.

In the figures, the same reference numbers are used for identical technical features.

DETAILED DESCRIPTION OF THE INVENTION

Figure 1:
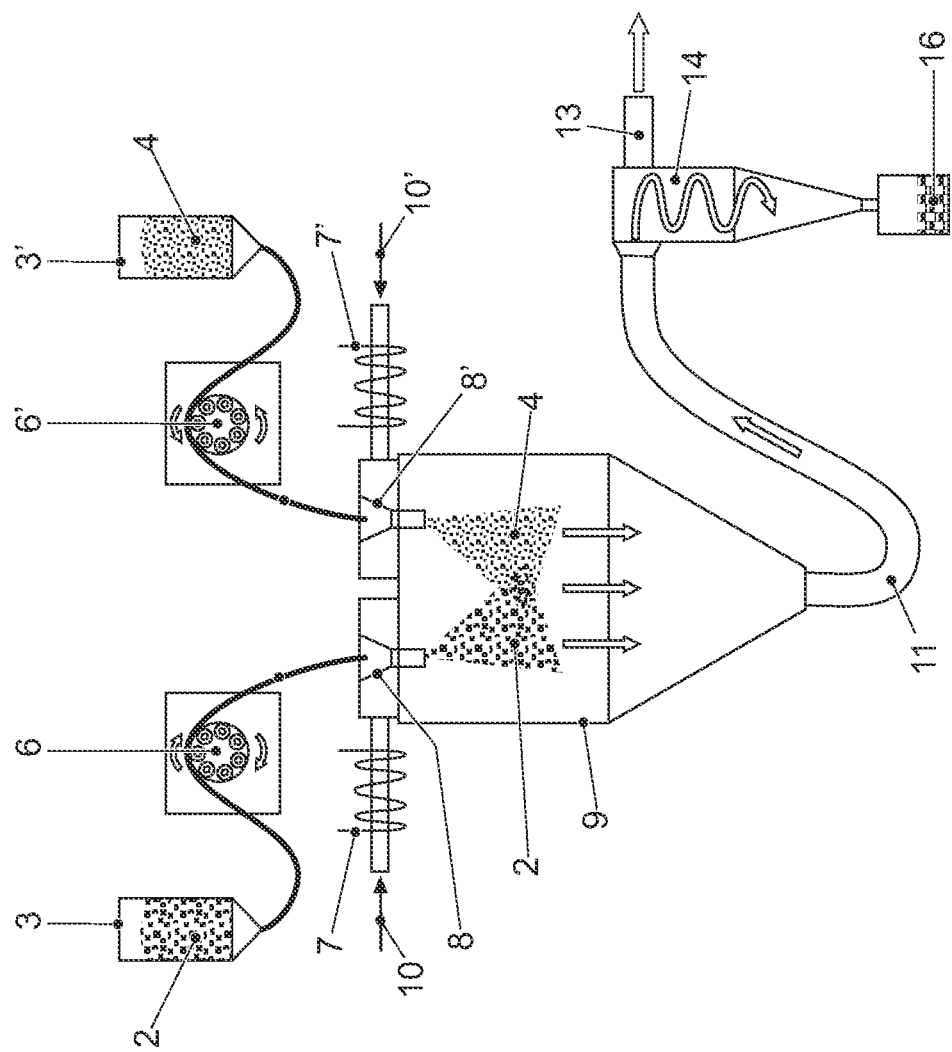
FIG. 1 shows a schematic diagram of system according to the invention for deposition of solid electrolyte material on electrode active material.

FIG. 1 shows a schematic diagram of a system 1 according to the invention for deposition of solid electrolyte material 4 on electrode active material 2. The electrode active material 2 is arranged in a first storage unit 3. In the present case, the solid electrolyte material 4 is stored in a second storage unit 3'. The storage units 3, 3' may be embodied here as reactors, reaction vessels or other types of containers in particular. The solid electrolyte material 4 and the electrode active material 2 may be stored here in the form of a suspension in particular in the storage units 3, 3'. The electrode active material may be embodied here in the form of sulfides, oxides, halides, phosphides, nitrides, chalcogenides, oxysulfides, oxyfluorides, sulfur fluorides or sulfur oxyfluorides or the like. The solid electrolyte material is preferably present in the form of a lithium ion conducting solid electrolyte, in particular LLZO and/or NASICON, but it may also be in the form of aluminum oxide, aluminum phosphate or aluminum fluoride or the like.

In the present case, the solid electrolyte material and the electrode active material are suspended in a suitable solvent. Examples of suitable solvents here include in particular aprotic solvents such as THF, cyclohexane, ethyl acetate, chloroform or the like.

The suspended electrode active materials 2 and solid electrolyte materials 4 are conveyed via a first feed means 6 and a second feed means 6' to a first dosing means 8 and a second dosing means 8'. The feed means 6, 6' here may be embodied in particular as pumps, for example, as hose pumps, rotary vane pumps, scroll pumps, turbomolecular pumps or the like. The dosing means 8, 8' may be configured as a device such as a hopper that allows the solid electrode active material to be fed into a reaction space.

While the electrode active material 2 and the solid electrolyte material 4 are being fed to the dosing means 8, 8' via the feed means 6, 6', an inert gas, for example, nitrogen or argon, is fed via the inert gas feed means 10, 10'. The inert gas thereby fed can be heated here to a desired feed temperature by means of the first heating means 7 and the second heating means 7'. The electrode active material 2 and the solid electrolyte material 4 are then fed to the reaction space 9 via the first dosing means 8 and the second dosing means 8'.

During the feed, the materials 2, 4 are finely distributed, wherein the electronic structure of the electrode active material 2 and that of the solid electrolyte material 4 are additionally influenced during the feed to the reaction space 9, so that the electrode active material 2 and the solid electrolyte material 4 are at least partially bonded to one another while retaining the crystal structure of the solid electrolyte material 4, in particular with the solid electrolyte materials being deposited on the electrode active materials.

Since the structure of the solid electrolytes is maintained during the coating process, the electrode active material is protected in particular because, on the one hand, there are no high temperatures acting on it, and, on the other hand, the electrode active material is also not attacked chemically.

The electrical structure of the electrode active material 2 and of the solid electrolyte material 4 is influenced here in particular by polarization and/or ionization of the materials 2, 4. For polarization and/or ionization of the solid electrolyte material and of the electrode active material, for example, a high negative or positive voltage can be applied to the dosing means 8, 8', for example, so that the electronic structure of the electrode active materials 2 and that of the solid electrolyte materials 4 fed via the dosing means 8, 8' are polarized or ionized oppositely from one another, such that bonding of the oppositely polarized and/or ionized materials to one another then takes place within the reaction space 9. Such an influence can take place, for example, by means of a method such as electron spray ionization, electron surge ionization or other suitable ionization methods.

After the bonding and/or deposition of parts of the solid electrolyte material on the electrode active material 2, the bonded materials are conveyed via a conveyance means 11 to a centrifugal separator 14, by means of which the bond particles are deposited. The materials may also be conveyed by means of the conveyance means 11 by utilization of electrostatic forces, for example, or by means of pumps. The solvent is preferably removed from the system 1 via the discharge device 13, which may also be embodied as a pump.

Figure 2:
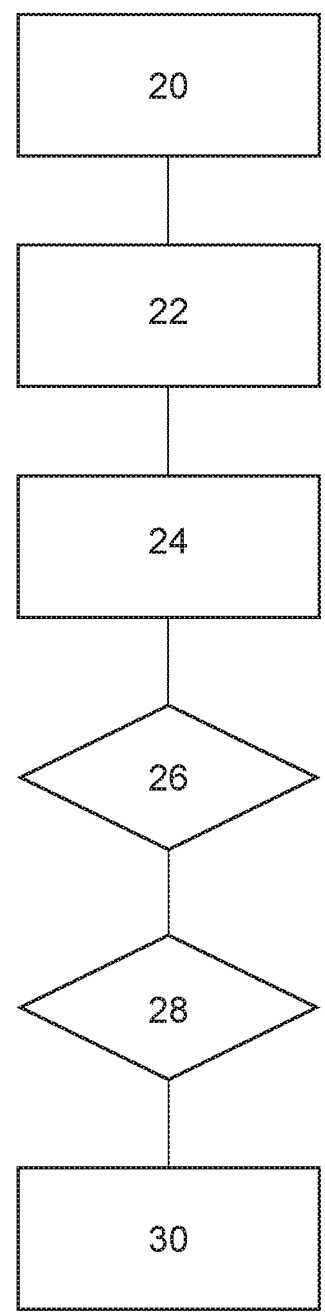
FIG. 2 shows a schematic diagram of the individual steps of a method according to the invention for deposition of solid electrolyte material on electrode active material.

FIG. 2 shows a schematic diagram of a method according to the invention for deposition of a solid electrolyte on electrode active material, such that electrode active material 2 is fed first from a first storage unit 3 to a first dosing means

8 in a first step with simultaneous feed 20 of solid electrolyte material 4 from a second storage unit 3' to a second dosing means 8'.

Then, in one step, there is a feed 22 of inert gas to the first dosing means 8 and the second dosing means 8' by means of an inert gas feed means 10, 10'. The inert gas thereby fed can optionally be heated to a desired feed temperature by means of a first heating means 7 and a second heating means 7'.

In one step, the feed 24 of the electrode active material 2 then takes place via the first dosing means 8 into a reaction space 9 with simultaneous feed 24 of the solid electrolyte material 4 via the second dosing means 8' into the reaction space 9.

During or after the feed 24 of the electrode active material 2 and/or of the solid electrolyte material 4 into the reaction space 9, the electronic structure of the materials 2, 4 is influenced in one step 26 in such a way that the materials 2, 4 bond at least partially to one another in a subsequent step 28 and/or the solid electrolyte materials 4 are deposited on the electrode active materials 2.

The materials 2, 4 here can be polarized or ionized oppositely from one another during or after the feed in particular, so that the materials 2, 4 become bonded during their further transport through the reaction space 9 and/or an attractive interaction takes place between the various materials 2, 4. This may take place by applying a high positive or negative voltage to the dosing means 8, 8', so that the materials 2, 4 fed via the dosing means 8, 8' are polarized or ionized. In addition, the materials 2, 4 may also be finely atomized while they are being fed 24 to the reaction space 9, which further increases the probability of bonding between the materials.

In a last step 30, the particles of the electrode active material 2 bonded to one another and the particles of the solid electrolyte material 4 are ultimately deposited from the reaction space 9 by means of a conveyance means 11 and a centrifugal separator 14.

By means of the method according to the invention and the system according to the invention for deposition of solid electrolyte material 4 on electrode active material 2, it is possible in particular to use a wide variety of materials for deposition on electrode active material and to deposit them easily and inexpensively on the electrode active material. Due to the deposition of solid electrolyte material on electrode active material, the electrode active material in particular is protected, which thus makes it possible to produce more stable electrodes with a longer life and/or to produce the cells that enclose the electrodes that are more stable and have a longer life.

LIST OF REFERENCE NUMERALS

1 System for deposition of solid electrolyte material on electrode active material
2 Electrode active material
3 First storage unit
3' Second storage unit
4 Solid electrolyte material
6 First feed means
6' Second feed means
7 First heating means
7' Second heating means
8 First dosing means
8' Second dosing means
9 Reaction space
10 First inert gas feed means
10' Second inert gas feed means
11 Conveyance means
13 Discharge device
14 Centrifugal separator
16 Electrode active material that is deposited and is provided with solid electrolyte material
20 Feed of solid electrolyte material or electrode active material
22 Feed of inert gas
24 Feed to the reaction space
26 Influencing the electronic structure
28 Bonding between solid electrolyte material and electrode active material
30 Deposition

The invention claimed is:

1. A method for deposition of solid electrolyte material on electrode active material, comprising the steps:
feeding electrode active material from a first storage unit to a first hopper, while simultaneously feeding solid electrolyte material from a second storage unit to a second hopper,
feeding inert gas to the first hopper and to the second hopper via an inert gas pump,
feeding the electrode active material via the first hopper into a reaction space, while simultaneously feeding the solid electrolyte material via the second hopper into the reaction space,
wherein an electronic structure of the electrode active material and of the solid electrolyte material during the simultaneous feed into the reaction space is influenced by the first hopper and the second hopper, such that the electrode active material and the solid electrolyte material bond to one another at least in part while retaining a crystal structure of the solid electrolyte material.

2. The method according to claim 1, wherein the solid electrolyte material and the electrode material are each suspended in solvents, separately from one another, prior to the simultaneous feed to the first and second dosing means, respectively.

3. The method according to claim 1, wherein the feed of the electrode active material to the first hopper and the simultaneous feed of the solid electrolyte material to the second hopper take place by means of two different pumps.

4. The method according to claim 1, wherein the electrode active material and the solid electrolyte material are oppositely polarized during the simultaneous feed into the reaction space.

5. The method according to claim 1, wherein the electrode active material and the solid electrolyte material are ionized oppositely from one another during the simultaneous feed into the reaction space.

6. The method according to claim 1, wherein the bonded particles of the electrode active material and of the solid electrolyte material from the reaction space are deposited by means of a centrifugal separator.

7. The method according to claim 1, wherein the solid electrolyte material is fed in a size of 2 to 5 nm.

8. The method according to claim 1, wherein the solid electrolyte material used is LLZO and/or NASICON.

9. The method according to claim 1, wherein the inert gas is heated during the feed.

10. A system for deposition of a solid electrolyte on electrode active material, comprising:
a first storage unit and a second storage unit for storage of electrode active material and solid electrolyte material, respectively, at least one pump for simultaneous feed of electrode active material and solid electrolyte material to a first hopper and a second hopper, respectively,
at least one inert gas pump for feed of inert gas to the first and the second hoppers,
wherein the first hopper is for feed of the electrode active material to a reaction space,
wherein the second hopper is for simultaneous feed of the solid electrolyte material to the reaction space,
wherein the first and second hoppers are designed so that the electronic structure of the electrode active material and of the solid electrolyte material can be influenced during the feed to the reaction space by way of the first and second hoppers, such that the electrode active material and the solid electrolyte material bond to one another at least in part while retaining a crystal structure of the solid electrolyte material.

* * * * *